United States Patent
Shimomura et al.

(10) Patent No.: US 12,499,935 B2
(45) Date of Patent: Dec. 16, 2025

(54) SENSE AMPLIFIER AND OPERATING METHOD OF THE SAME

(71) Applicant: TAIWAN SEMICONDUCTOR MANUFACTURING COMPANY, LTD., Hsinchu (TW)

(72) Inventors: Shigeki Shimomura, Cupertino, CA (US); Yongxi Li, San Jose, CA (US)

(73) Assignee: TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 205 days.

(21) Appl. No.: 18/169,100

(22) Filed: Feb. 14, 2023

(65) Prior Publication Data
US 2024/0112726 A1  Apr. 4, 2024

Related U.S. Application Data

(60) Provisional application No. 63/412,943, filed on Oct. 4, 2022.

(51) Int. Cl.
*G11C 11/419* (2006.01)
(52) U.S. Cl.
CPC ................... *G11C 11/419* (2013.01)
(58) Field of Classification Search
CPC .............. G11C 11/419; G11C 11/4074; G11C 11/4076; G11C 11/4091
See application file for complete search history.

(56) References Cited

U.S. PATENT DOCUMENTS

| 7,084,671 B1* | 8/2006 | Wendell | G11C 7/065 327/51 |
| 9,865,327 B1* | 1/2018 | Hirota | G11C 7/08 |
| 2022/0084590 A1* | 3/2022 | Jang | G11C 7/08 |

OTHER PUBLICATIONS

Evert Seevinck et al., "Current-Mode Techniques for High-speed VLSI Circuits with Application to Current Sense Amplifier for CMOS SRAM's", IEEE Journal of Solid-State Circuits, vol. 26, No. 4, Apr. 1991, pp. 525-536.
Travis N. Blalock et al., "A High-speed Clamped Bit-Line Current-Mode Sense Amplifier", IEEE Journal of Solid-State Circuits, vol. 26, No. 4, Apr. 1991, pp. 542-548.
(Continued)

*Primary Examiner* — Amir Zarabian
*Assistant Examiner* — Bradley S Coon
(74) *Attorney, Agent, or Firm* — Maschoff Brennan (57) ABSTRACT

A memory device includes a memory array and a sense amplifier. The sense amplifier operates with a first supply voltage and be enabled, in response to an enable signal, to receive first and second current signals from the memory array through first and second nodes, and includes a pull-up circuit and a latch circuit. The pull-up circuit is coupled between a first supply voltage terminal and the first to second nodes, and couples, in response to a first control signal having a low logic state, the first supply voltage terminal to the first and second nodes. The latch circuit generates, in response to the first and second current signals received from the first and second nodes, first and second output signals for determining a data stored in a memory cell in the memory array when the first supply voltage terminal is coupled to the first and second nodes.

20 Claims, 8 Drawing Sheets

(56) References Cited

OTHER PUBLICATIONS

Katsuro Sasaki et al., "A 7-ns 140-mW 1-Mb CMOS SRAM with Current Sense Amplifier", IEEE Journal of Solid-State Circuits, vol. 21, No. 11. Nov. 1992, pp. 1511-1518.
Katsunori Seno et al., "A 9-ns 16-Mb CMOS SRAM with Offset-Compensated Current Sense Amplifier", IEEE Journal of Solid-State Circuits, vol. 28, No. 11, Nov. 1993, pp. 1119-1124.
Masanori Izumikawa et al., "A 400MHz, 300mW, 8kb, CMOS SRAM Macro with a Current Sensing Scheme", IEEE 1994 Custom Integrated Circuits Conference, pp. 595-598.
Koichiro Ishibashi et al., "A 6-ns 4-Mb CMOS SRAM with Offset-Voltage-Insensitive Current Sense Amplifiers", IEEE Journal of Solid-State Circuits, vol. 30, No. 4, Apr. 1995, pp. 480-486.

* cited by examiner

SENSE AMPLIFIER AND OPERATING METHOD OF THE SAME

CROSS REFERENCE

The present application claims priority to U.S. Provisional Application No. 63/412,943, filed on Oct. 4, 2022, which is herein incorporated by reference in its entirety.

BACKGROUND

Nowadays, sense amplifiers for SRAM (static random access memory) utilize voltage sense amplifiers that require a "wait time" for a bit line pair to be developed a certain voltage differential (define this as Vdiff). Moreover, at lower supply voltage VDD is provided, SRAM cells show more device variation induced device mismatches and decrease read stability, especially when word line (WL) is asserted. Moreover, read currents (or cell currents) in SRAM become smaller under lower supply voltage VDD. In addition, when the word line duration becomes too long, eventually the data stored in the SRAM cell is corrupted and no longer be operated. Thus, word line duration should be limited at extreme lower supply voltage VDD condition. On the other hand, SRAM cell stability loss occurs at high supply voltage VDD as well, especially for SRAM cells with the same Pulldown (PD) & passgate (PG) device size (this is referred as Beta ratio ($\beta$)~1 or "unit $\beta$" SRAM cell). SNM (Static Noise Margin) based approach will never be applicable in above situations. It also injects pessimism into yield projection as well, which can lead to an extra cost or over designs.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

The terms used in this specification generally have their ordinary meanings in the art and in the specific context where each term is used. The use of examples in this specification, including examples of any terms discussed herein, is illustrative only, and in no way limits the scope and meaning of the disclosure or of any exemplified term. Likewise, the present disclosure is not limited to various embodiments given in this specification.

As used herein, the terms "comprising," "including," "having," "containing," "involving," and the like are to be understood to be open-ended, i.e., to mean including but not limited to.

Reference throughout the specification to "one embodiment," "an embodiment," or "some embodiments" means that a particular feature, structure, implementation, or characteristic described in connection with the embodiment(s) is included in at least one embodiment of the present disclosure. Thus, uses of the phrases "in one embodiment" or "in an embodiment" or "in some embodiments" in various places throughout the specification are not necessarily all referring to the same embodiment. Furthermore, the particular features, structures, implementation, or characteristics may be combined in any suitable manner in one or more embodiments.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly. As used herein, the term "and/or" includes any and all combinations of one or more of the associated listed items.

As used herein, "around", "about", "approximately" or "substantially" shall generally refer to any approximate value of a given value or range, in which it is varied depending on various arts in which it pertains, and the scope of which should be accorded with the broadest interpretation understood by the person skilled in the art to which it pertains, so as to encompass all such modifications and similar structures. In some embodiments, it shall generally mean within 20 percent, preferably within 10 percent, and more preferably within 5 percent of a given value or range. Numerical quantities given herein are approximate, meaning that the term "around", "about", "approximately" or "substantially" can be inferred if not expressly stated, or meaning other approximate values.

Figure 1:
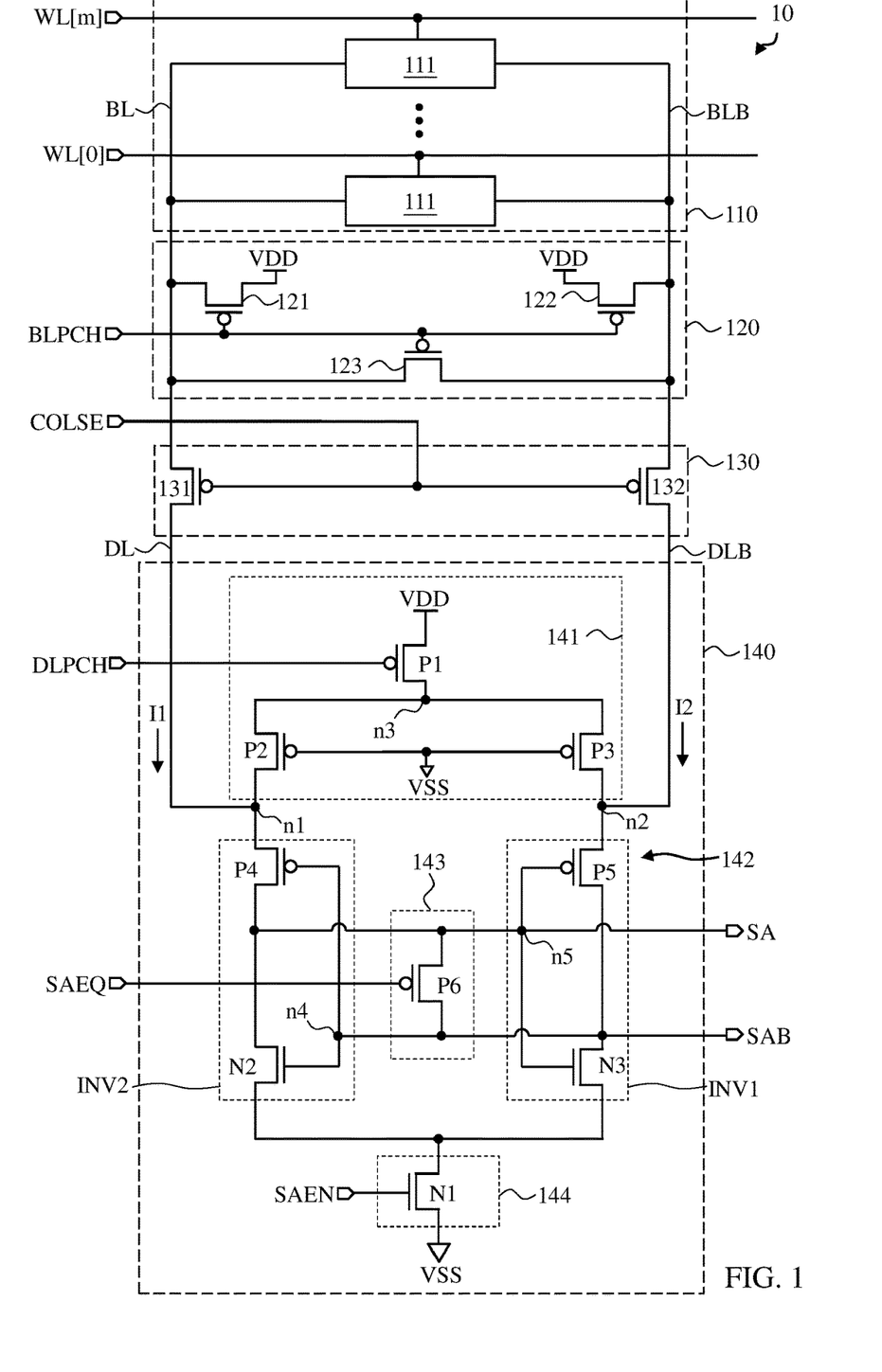
FIG. 1 is a schematic diagram of part of a memory device, in accordance with some embodiments of the present disclosure.

Reference is now made to FIG. 1. FIG. 1 is a schematic diagram of part of a memory device 10, in accordance with some embodiments of the present disclosure. For illustration, the memory device 10 includes a memory array 110, a bit line pre-charge circuit 120, a column selection circuit 130, and a sense amplifier 140. As shown in FIG. 1, the memory array 110 is coupled to the bit line pre-charge circuit 120 and the column selection circuit 130 through complementary bit lines BL and BLB. The column selection circuit 130 is further coupled to the sense amplifier 140 through complementary data lines DL and DLB. FIG. 1 illustrates a single column readout path circuit diagram, and the configurations of FIG. 1 are given for illustrative purposes. Various implements are within the contemplated scope of the present disclosure. For example, in some embodiments, the memory device 10 further includes multiple columns of memory arrays with corresponding bit line pre-charge circuit 120, column selection circuit 130 and sense amplifier 140 in each column. The column selection circuit 130 in a certain column is configured to be activated to transmit signals from a memory cell 111 of the memory array 110 in the certain column to a corresponding sense amplifier 140 for reading out the data stored in the memory cell 111.

The memory array 110 includes multiple memory cells 111 that are coupled in parallel between the bit lines BL and BLB and arranged in (m+1) rows, in which each of the memory cells 111 in a row is configured to be activated in response to a corresponding one of word line signals WL[0]-WL[m] in read or write operation. In some embodiments, The memory cell 111 includes a static random access memory (SRAM) formed of numbers of transistors. For example, in some embodiments, the memory cell can be formed of 4, 6, or 10 transistors. Each memory cell 111 includes a pair of inverters that operate together in a loop to store true and complement data.

The bit line pre-charge circuit 120 pre-charges and equalizes the bit lines BL and BLB in response to a control signal BLPCH before the read operation. The bit line pre-charge circuit 120 transfers a supply voltage VDD from a supply voltage terminal to the bit lines BL and BLB. This function is performed by P-type transistors 121 and 122. The bit line pre-charge circuit 120 equalizes levels of the bit lines BL and BLB to have substantially the same voltage. Equalization is made by connecting the bit lines BL and BLB through a P-type transistor 123.

The column selection circuit 130 includes a P-type transistor 131 coupled between the bit line BL and the data line DL and a P-type transistor 132 coupled between the bit line BLB and the data line DLB. In some embodiments, the column selection circuit 130 is configured to transmit the current signals I1 and I2 to the sense amplifier 140 in response to a selection signal COLSE.

As illustratively shown in FIG. 1, the sense amplifier 140 is coupled to the data lines DL and DLD at nodes n1 and n2. In some embodiments, the sense amplifier 140 is configured to operate with the supply voltages VDD and VSS and be enabled, in response to an enable signal SAEN, to receive the current signals I1 and I2 from the memory array 110 through the column selection circuit 130 and the nodes n1-n2. For illustration, the sense amplifier 140 includes a pull-up circuit 141, a latch circuit 142, an equalization circuit 143, and an enable stage circuit 144.

As illustratively shown in FIG. 1, the sense amplifier 140 is coupled to the data lines DL and DLB at nodes n1 and n2. In some embodiments, the sense amplifier 140 is configured to operate with the supply voltages VDD and VSS and be enabled, in response to an enable signal SAEN, to receive the current signals I1 and I2 from the memory array 110 through the column selection circuit 130 and the nodes n1-n2. For illustration, the sense amplifier 140 includes a pull-up circuit 141, a latch circuit 142, an equalization circuit 143, and an enable stage circuit 144.

The pull-up circuit 141 is coupled between the supply voltage terminal (also referred to as VDD) providing the supply voltage VDD and the nodes n1-n2. In some embodiments, the pull-up circuit 141 is configured to couple, in response to a control signal DLPCH having a low logic state (e.g., "o"), the supply voltage terminal VDD to the nodes n1-n2. Specifically, the pull-up circuit 141 includes P-type transistors P1-P3. The transistor P1 has a terminal coupled to the supply voltage terminal VDD, another terminal coupled to node n3, and the other terminal receiving the control signal DLPCH. The transistor P1 is configured to be turned on in response to the control signal DLPCH. The transistor P2 is coupled between the nodes n1 and n3, and specifically, has a terminal coupled to the data line DL and another terminal coupled to the node n3. The transistor P3 is coupled between the nodes n2 and n3, and specifically has a terminal coupled to the data line DLB and another terminal coupled to the node n3. Gate terminals (also referred to as control terminals) of the transistors P2-P3 are coupled together to a supply voltage terminal (also referred to as VSS), providing the supply voltage VSS. In some embodiments, the supply voltage VSS has a ground potential or a voltage level smaller than that of the supply voltage VDD. In some embodiments, the transistors P2-P3 provides a low-impedance clamp between the data lines DL, DLB and the supply voltage VDD. In operation of the embodiments of FIG. 1, the transistors P2-P3 keep turned on in response to the supply voltage VSS (e.g., having low logic state), and the transistor P1 is turned on in response to the control signal DLPCH having the low logic state to transmit the supply voltage VDD to the nodes n1-n2 through the transistors P2-P3.

The latch circuit 142 is configured to generate, in response to the current signals I1 and I2 received from the nodes n1-n2, output signals SA and SAB for determining a data stored in a memory cell 111 in the memory array 110 when the supply voltage terminal VDD is coupled to the nodes n1-n2. For illustration, the latch circuit 142 includes inverters INV1 and INV2 that are cross-coupled with each other. For illustration, the inverter INV1 has a pull-up transistor P5 and a pull-down transistor N3. The transistor P5 has a source terminal coupled to the data line DLB at the node n2 and a drain terminal coupled to a drain terminal of the transistor N3 at an output terminal of the inverter INV1 (also referred to as an output terminal n4 of the latch circuit 142). A source terminal of the transistor N3 is coupled to the enable stage circuit 144. Control terminals of the transistors P5 and N3, together referred to as input terminal of the inverter INV1, are coupled to an output terminal of the inverter INV2. The inverter INV2 has a pull-up transistor P4 and a pull-down transistor N2. The transistor P4 has a source terminal coupled to the data line DL at the node n1 and a drain terminal coupled to a drain terminal of the transistor N2 at an output terminal of the inverter INV2 (also referred to as an output terminal n5 of the latch circuit 142). A source terminal of the transistor N2 is coupled to the enable stage circuit 144. Control terminals of the transistors P4 and N2, together referred to as an input terminal of the inverter INV1, are coupled to the output terminal of the inverter INV1. The latch circuit 142 generates the output signal SA at the output terminal n5 and the output signal SAB at the output terminal n4.

The equalization circuit 143 is coupled between the output terminals n4 and n5. In some embodiments, the equalization circuit 143 includes a P-type transistor P6 that has a terminal coupled to the output terminal n4, another terminal coupled to the output terminal n5, and a control terminal configured to receive a control signal SAEQ. In some embodiments, the transistor P6 is turned on in response to the control signal SAEQ having the low logic state to equalize the output signals SA and SAB.

The enable stage circuit 144 is coupled between the latch circuit 142 and the supply voltage terminal VSS. In some embodiments, the enable stage circuit 144 includes a N-type transistor N1 that has a terminal coupled to the drain terminals of the transistors N2-N3, another terminal coupled to the supply voltage terminal VSS, and a control terminal configured to receive a control signal SAEN. In some embodiments, the transistor N1 is turned on in response to the control signal SAEN having the high logic state to sink the current signals I1-I2.

Figure 2:
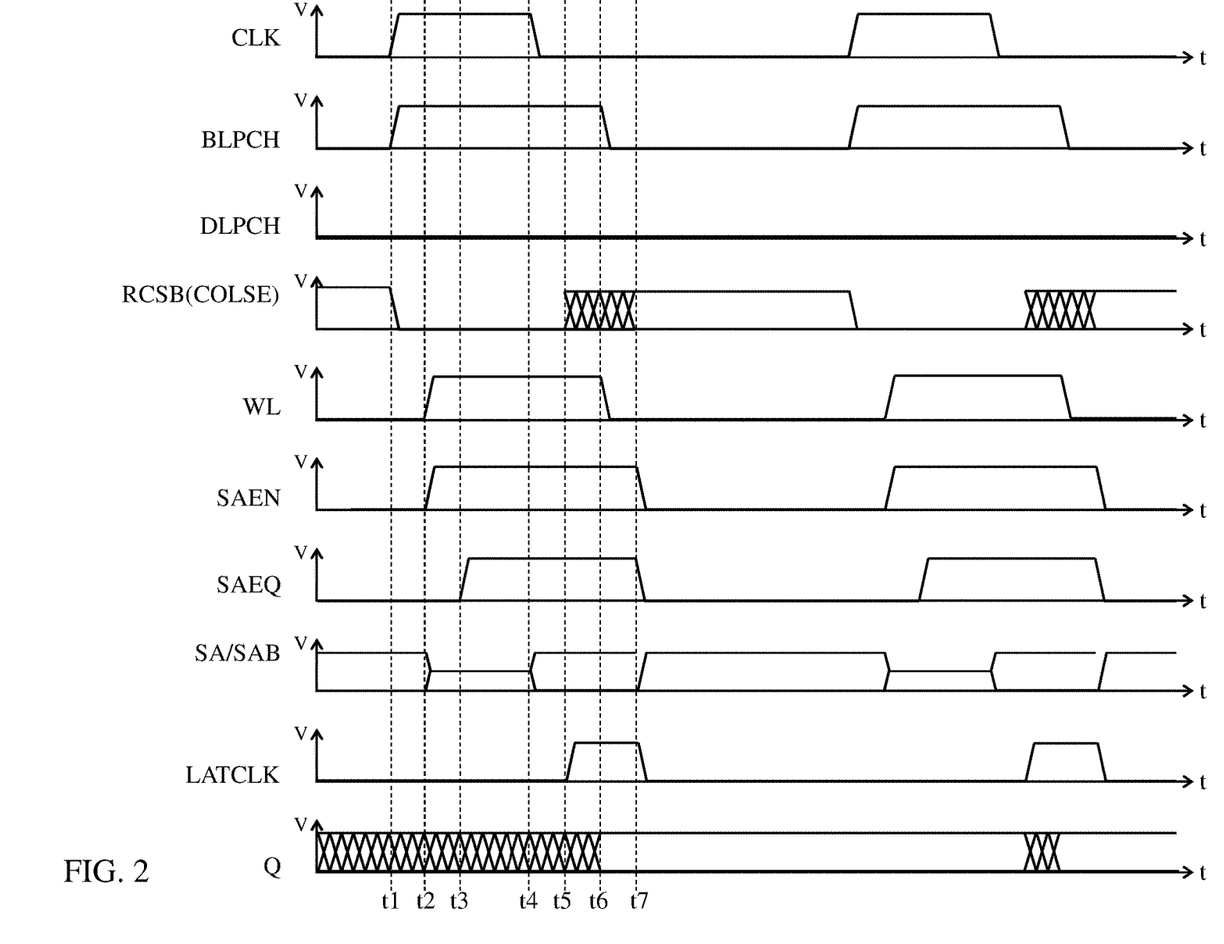
FIG. 2 illustrates waveforms of signals in the memory device corresponding to FIG. 1, in accordance with some embodiments of the present disclosure.
Figure 3:
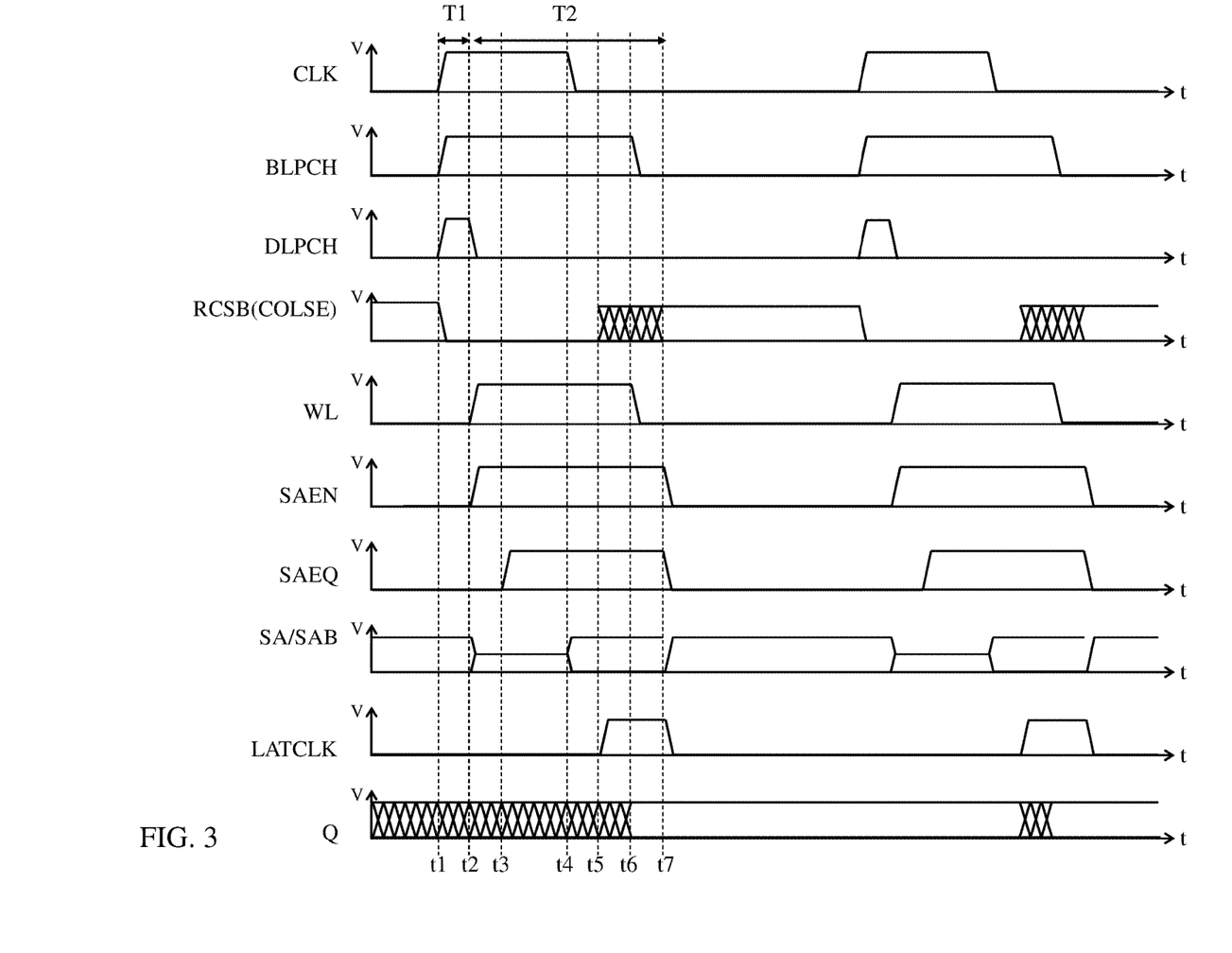
FIG. 3 illustrates waveforms of signals in the memory device corresponding to FIG. 1, in accordance with some embodiments of the present disclosure.

The operation configurations of the memory device 10 in FIG. 1 are discussed in the following paragraphs with reference to FIGS. 2 and 3. FIGS. 2 and 3 illustrate waveforms of signals in the memory device 10 corresponding to FIG. 1, in accordance with some embodiments of the present disclosure. In some embodiments, FIG. 2 corresponds to a first operation mode (e.g., referred to as a normal voltage mode) of the memory device 10 in which the supply voltage VDD has a voltage value greater than or equal to about 0.6 Volts, and FIG. 3 corresponds to a second operation mode (e.g., referred to as a low voltage mode) of the memory device 10 in which the supply voltage VDD has a voltage value smaller than that in the first operation mode, for example, being smaller than about 0.6 Volts.

With reference to both FIGS. 1 and 2, in the whole operation, the control signal DLPCH keeps having the low logic state, and accordingly, the supply voltage VDD is provided to the sense amplifier 140. Specifically, in the normal voltage mode of the memory device 10, the transistor P1 keeps turned on during the read operation of the memory cell 111.

At time t1, a clock signal CLK for the memory device 10 rises for performing the read operation. The bit line pre-charge circuit 120 is turned off in response to the control signal BLPCH rising to have the high logic state. In response to a read column select bar signal RCSB, controlling the selection signal COLSE, falls, the column selection circuit 130 is turned on to couple the bit line BL with the data line DL to couple the bit line BLB with the data line DLB. As the enable signal SAEN has the logic state and the sense amplifier 140 is turned off, the output signals SA and SAB are floated.

At time t2, a word line signal WL (e.g., one of the word line signals WL[0]-WL[m]) rises to activate the memory cell 111 coupled thereto. The sense amplifier 140 is turned on in a biasing phase in response to the enable signal rising to turn on the enable stage circuit 144, and the sense amplifier 140 is biased by the current signal I1 in the data line DL flowing to the node n1 and the current signal I2 in the data line DLB flowing to the node n2. Accordingly, the latch circuit 142 generates the output signals SA and SAB that have the same voltage level, for example, VDD/2, as the equalization circuit 143 is turned on in response to the control signal SAEQ having the low logic state. In some embodiments, the word line signal WL has the voltage level equal to the supply voltage VDD.

At time t3, the equalization circuit 143 is turned off in in response to the control signal SAEQ rising. During time t3 to time t4, the sense amplifier 140 is in a sensing phase to sense a current difference between the current signals I1 and I2.

At time t4, the latch circuit 142 operates as a feedback amplifier and the transistors P4-P5 are sourcing the current difference between the current signals I1 and I2. The latch circuit 142 generates, according to a voltage difference induced by the current difference, one of the output signals SA and SAB to have the voltage level equal to the supply voltage VDD and the other to have the voltage level equal to the ground potential (e.g., about 0 Volts). The voltage difference crosses the output terminals n4-n5.

At time t5, in response to a clock signal LATCLK rising, an output latch circuit (not shown) in the memory device 10 generate an output data signal that is associated with the output signals SA and SAB and indicates the data stored in the corresponding memory cell 111 which is accessed in the read operation.

At time t6, the word line signal WL falls and the bit line pre-charge circuit 120 is turned on again in response to the control signal BLPCH falling.

At time t7, the sense amplifier 140 is turned off in response to the enable signal SAEN falling and the equalization circuit 143 is turned on in response to the control signal SAEQ falling. Accordingly, the output signals SA and SAB are floated. In some embodiments, the read operation ends at time t7.

In some approaches, for the purpose of solving read disturb and stabilizing the configurations of the memory device in the read operation, a duration in which the word line is asserted is limited to prevent the stored data from being corrupted, especially when the supply voltage VDD goes smaller. However, the voltage sense amplifier for read operation requires to wait for a voltage differential to develop on sense nodes, which imposes a certain delay from word line assertion time for the sense amplifier to correctly capture data stored in the accessed memory cell. Consequently, slower reading speed and reliability of memory cells are great concern for accuracy of read operation.

With the configurations of the present application, the sense amplifier 140 operates as a current sense amplifier and is enabled at the same time the word line is asserted. Accordingly, faster access time in read operation is achieved. Moreover, by sensing the currents, the sensing scheme is capacitance insensitive, and thus numbers of memory cells (e.g., bits) is flexible to increase for actual practice of the present application. In addition, tracking circuits and read assist circuits are no more required due to the faster speed provided in the application, compared with some approaches. Based on the above discussion, the performance and power/area reduction are improved. Furthermore, for the current sense amplifier provided in the application, as long as the read current is sufficient enough for the amplifier to sense correctly, the voltage level for asserting word lines does not to be pull up to full scale (the supply voltage VDD), and accordingly, minimum read voltage is reduced compared with conventional voltage sense amplifiers. Therefore, power consumption of the memory devices is upgraded.

With reference to both FIGS. 1 and 3, FIG. 3 illustrates waveforms of signals for the memory device 10 operating in the second mode (low voltage mode). For illustration, compared with the embodiments of FIG. 2, instead of the control signal DLPCH having the low logic state to turn on the pull-up circuit 141 during the whole read operation, at time t1 of FIG. 3, when the clock signal CLK rises, the pull-up circuit 141 is configured to be turned off in response to the control signal DLPCH having the high logic state before the sense amplifier 140 is turned on in response to the enable signal having the high logic state at time t2. Specifically, the transistor P1 is turned off in a time interval T1 (e.g., time t1 to time t2) of the read operation. Alternatively stated, in the low voltage mode, the pull-up circuit 141 is configured to disconnect the supply voltage terminal VDD from the nodes n1-n2 before the sense amplifier 140 is enabled. Meanwhile, the column selection circuit 130 is turned on in response to the selection signal to transmit the current signals I1 and I2 to the sense amplifier 140 when the pull-up circuit 141 is turned off.

In a time interval T2 (e.g., time t2 to time t7) of the read operation, the pull-up circuit 141 is turned on when the sense amplifier 140 is enabled at t2 in response to the rising enable signal. Specifically, the transistor P1 is turned on, in response to the control signal falling to have the low logic state in the time interval T2 after the time interval T1.

Compared with some approaches that use the voltage sense amplifiers for sensing, with the configurations of the present application, utilizing pulses to temporarily isolate the supply voltage VDD from the latch circuit before the sense amplifier is enabled provides longer time in which the currents develop in data lines DL and DLB in the low voltage mode. It extends the read voltage and further cuts the power in operating the memory device.

The configurations of FIGS. 1-3 are given for illustrative purposes. Various implements are within the contemplated scope of the present disclosure. For example, in some embodiments, the operations depicted by the waveforms in FIG. 3 are applicable in the normal voltage mode. In some embodiments, the signal Q indicates the data transmitted to the memory device.

Figure 4:
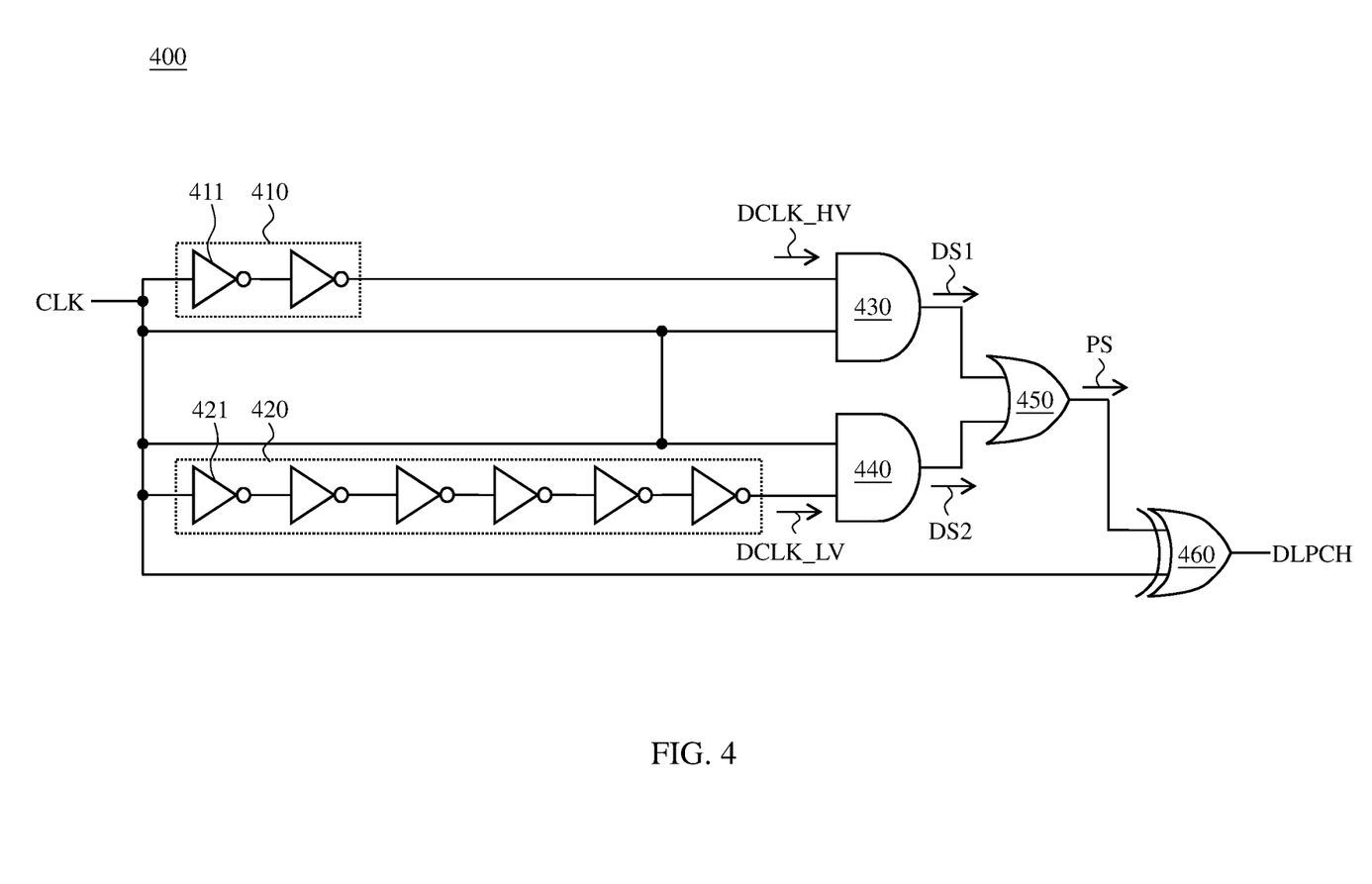
FIG. 4 is a schematic diagram of a signal generator, in accordance with some embodiments of the present disclosure.

Further details of the control signal DLPCH in the normal and low voltage modes for manipulating read operation are discussed below with reference to FIGS. 4-6. Reference is now made to FIG. 4, FIG. 4 is a schematic diagram of a signal generator 400, in accordance with some embodiments of the present disclosure. In some embodiments, the signal generator 400 is configured to generate, in response to the clock signal CLK, the control signal DLPCH having the pulse to turn off the pull-up circuit 141 before the sense amplifier is enabled.

For illustration, the signal generator 400 includes delay circuits 410-420, AND gates 430-440, an OR gate 450, and an exclusive-OR (XOR) gate 460. The delay circuit 410 is coupled to a first input of the AND gate 430, and the delay circuit 420 is coupled to a first input of the AND gate 440. Second inputs of the AND gates 430-440 are coupled together to receive the clock signal CLK. Outputs of the AND gates 430-440 are coupled to respective inputs of the OR gate 450. An output of the OR gate 450 is coupled to a first input of the XOR gate 460 and a second input of the XOR gate 460 receives the clock signal CLK.

The delay circuits 410-420 are configured to generate the delay clock signal DCLK_HV and DCLK_LV according to the clock signal CLK respectively. In some embodiments, the delay circuits 410-420 have different numbers of inverters, which induces various time latency in a delay clock signal DCLK_HV generated by the delay circuit 410 and a delay clock signal DCLK_LV generated by the delay circuit 420. For example, as illustratively shown in FIG. 4, the delay circuit 410 includes less number of inverters than the delay circuit 420. Specifically, the delay circuit 410 includes series-coupled two inverters 411 and the delay circuit 420 includes series-coupled six inverters 421.

Furthermore, in some embodiments, each of the inverters 411 has a threshold voltage Vth1 greater than a threshold voltage Vth2 of each inverter 421. Accordingly, in the normal voltage mode of the memory device 10 when the clock signal has an amplitude that corresponds to the level of the supply voltage VDD and is greater than the threshold voltage Vth1, the clock signal CLK propagates through the inverters 411 and the delay circuit 410 generates the delay clock signal DCLK_HV as shown in FIG. 5. In contrast, in the low voltage mode of the memory device 10 when the clock signal has an amplitude less than the threshold voltage Vth1, the clock signal CLK does not propagate through the inverters 411. Accordingly, the delay circuit 410 generates the delay clock signal DCLK_HV having the low logic state (e.g., 0 Volt as shown in FIG. 6).

The AND gate 430 is configured to generate a delay signal DS1 according to the clock signal CLK and the delay clock signal DCLK_HV. The AND gate 440 is configured to generate a delay signal DS2 according to the clock signal CLK and a delay clock signal DCLK_LV. The OR gate 450 is configured to generate a pulse signal PS according to the delay signals DS1-DS2. The XOR gate 460 is configured to generate the control signal DLPCH according to the clock signal CLK and the pulse signal PS.

Figure 5:
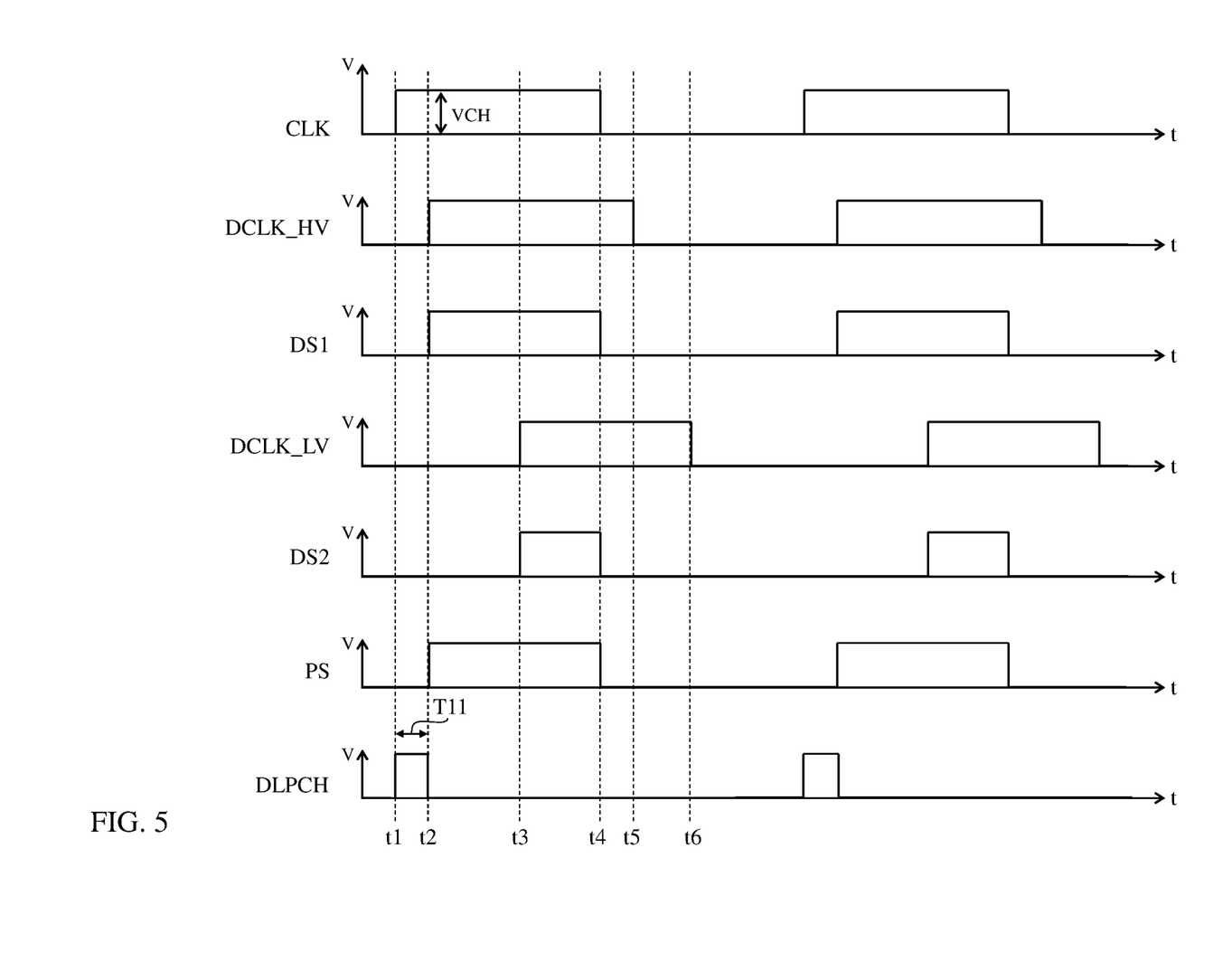
FIG. 5 illustrates waveforms of signals in the signal generator operating in a normal voltage mode, in accordance with some embodiments of the present disclosure.
Figure 6:
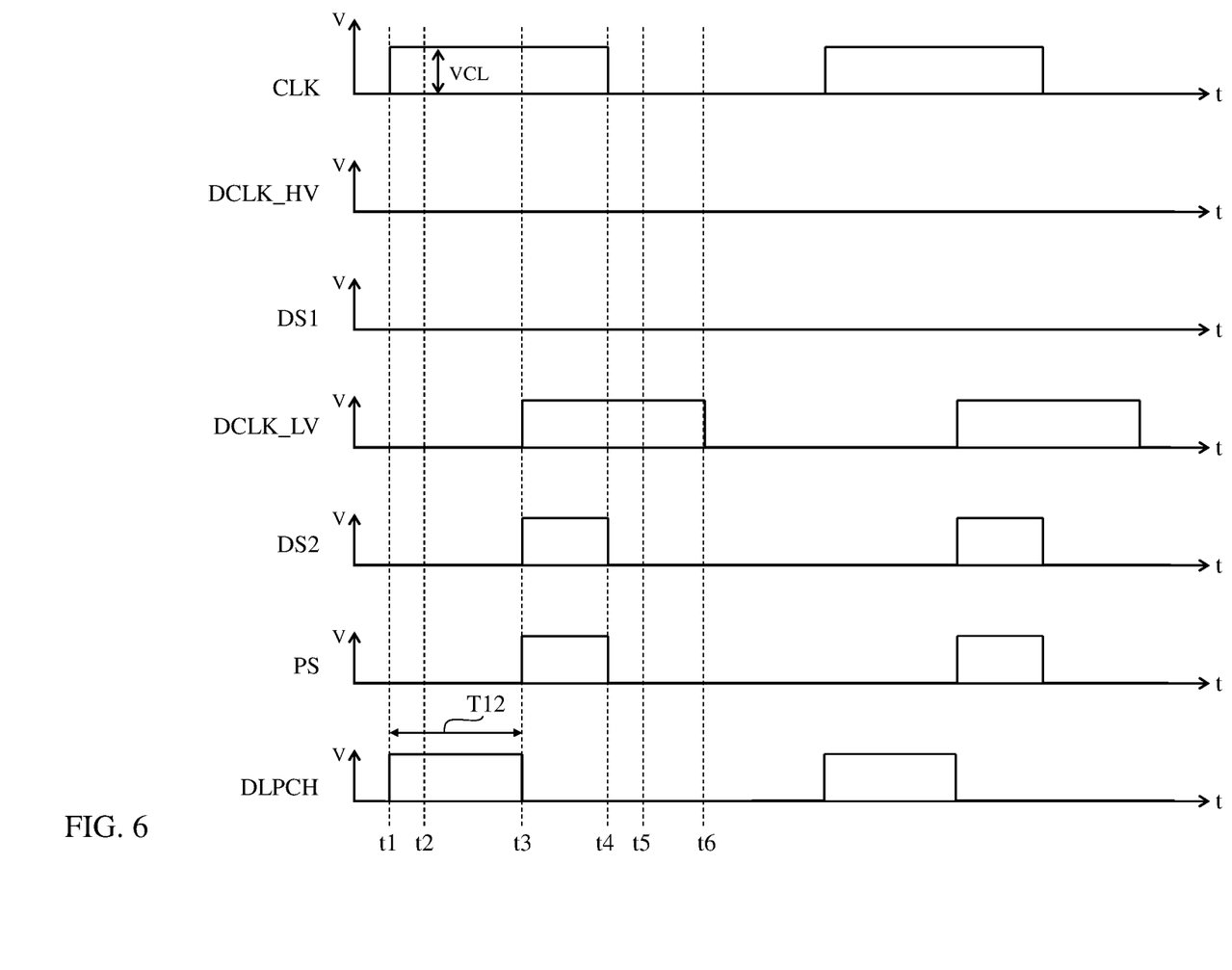
FIG. 6 illustrates waveforms of signals in the signal generator operating in a low voltage mode, in accordance with some embodiments of the present disclosure.

In some embodiments, with reference to FIGS. 4-6, when the clock signal has amplitude greater than the threshold voltage Vth1, the control signal DLPCH has pulses having a first width T11 as shown in FIG. 5. When the clock signal has amplitude smaller smaller than the threshold voltage Vth1, the control signal DLPCH has pulses having a second width T12, as shown in FIG. 6, which is smaller than the first width T11. In various embodiments, the amplitude of the clock signal equals to the supply voltage VDD. Alternatively stated, the width of pulses in the control signal DLPCH is associated with the voltage level of the supply voltage VDD. In some embodiments, the widths T11 and T12 correspond to the time interval T1 depicted in FIG. 3. The detailed configurations of signals in FIG. 4 are discussed in the following paragraphs with reference to FIGS. 5-6.

The configurations of FIG. 4 are given for illustrative purposes. Various implements are within the contemplated scope of the present disclosure. For example, in some embodiments, the number of inverters 411 included in the delay circuit 410 is more than two and the number of inverters 421 included in the delay circuit 420 is more or less than six.

FIG. 5 illustrates waveforms of signals in the signal generator 400 operating in the normal voltage mode, in accordance with some embodiments of the present disclosure. Referring to FIGS. 4-5, in the normal voltage mode, when the clock signal CLK is propagating through both the delay circuits 410-420, in response to the clock signal CLK rising at time t1 to has a voltage VCH greater than the threshold voltage of the inverters 411, the delay circuit 410 outputs the delay clock signal DCLK_HV having the high logic state to the AND gate 430 and the AND gate 430 performs an AND operation of the clock signal CLK and the delay clock signal DCLK_HV to generate the delay signal DS1 having the high logic state at time t2. Similarly, due to time latency provided by the greater number of inverters 421 in the delay circuit 420, at time t3 after time t2, the delay circuit 420 outputs the delay clock signal DCLK_LV having the high logic state to the AND gate 440 and the AND gate 440 performs an AND operation of the clock signal CLK and the delay clock signal DCLK_LV to generate the delay signal DS2 having the high logic state.

The OR gate 450 performs an OR operation of the delay signals DS1-DS2 to generate the pulse signal PS that has the low logic state during times t1-t2 and has the high logic state during times t2-t4. The XOR gate 460 performs an XOR operation of the pulse signal PS and the clock signal CLK to generate the control signal DLPCH has the high logic state in a time interval T11. Alternatively stated, the control signal DLPCH has a pulse having a width equal to T11.

Reference is now made to FIG. 6. FIG. 6 illustrates waveforms of signals in the signal generator 400 operating in the low voltage mode, in accordance with some embodiments of the present disclosure.

Referring to FIG. 6, for the low voltage mode, in response to the clock signal CLK, having a voltage VCL smaller than the threshold voltage Vth1 of the inverters 411, the delay circuit 410 outputs the delay clock signal DCLK_HV having the low logic state to the AND gate 430 and the AND gate 430 generates the delay signal DS1 having the low logic state. Accordingly, the OR gate 450 generates the pulse signal PS that corresponds to the delay signal DS2 and has the low logic state during times t1-t3 and the high logic state during times t3-t4. The XOR gate 460 further performs the XOR operation of the pulse signal PS and the clock signal CLK to generate the control signal DLPCH having the high logic state in a time interval T12, which is longer than the time interval T11. Alternatively stated, the control signal DLPCH has a pulse a width equal to T12.

The configurations of FIGS. 5-6 are given for illustrative purposes. Various implements are within the contemplated scope of the present disclosure. For example, in some embodiments, the signals depicted in FIGS. 5-6 have delay in rising edges and falling edges as shown in FIG. 3.

Figure 7:
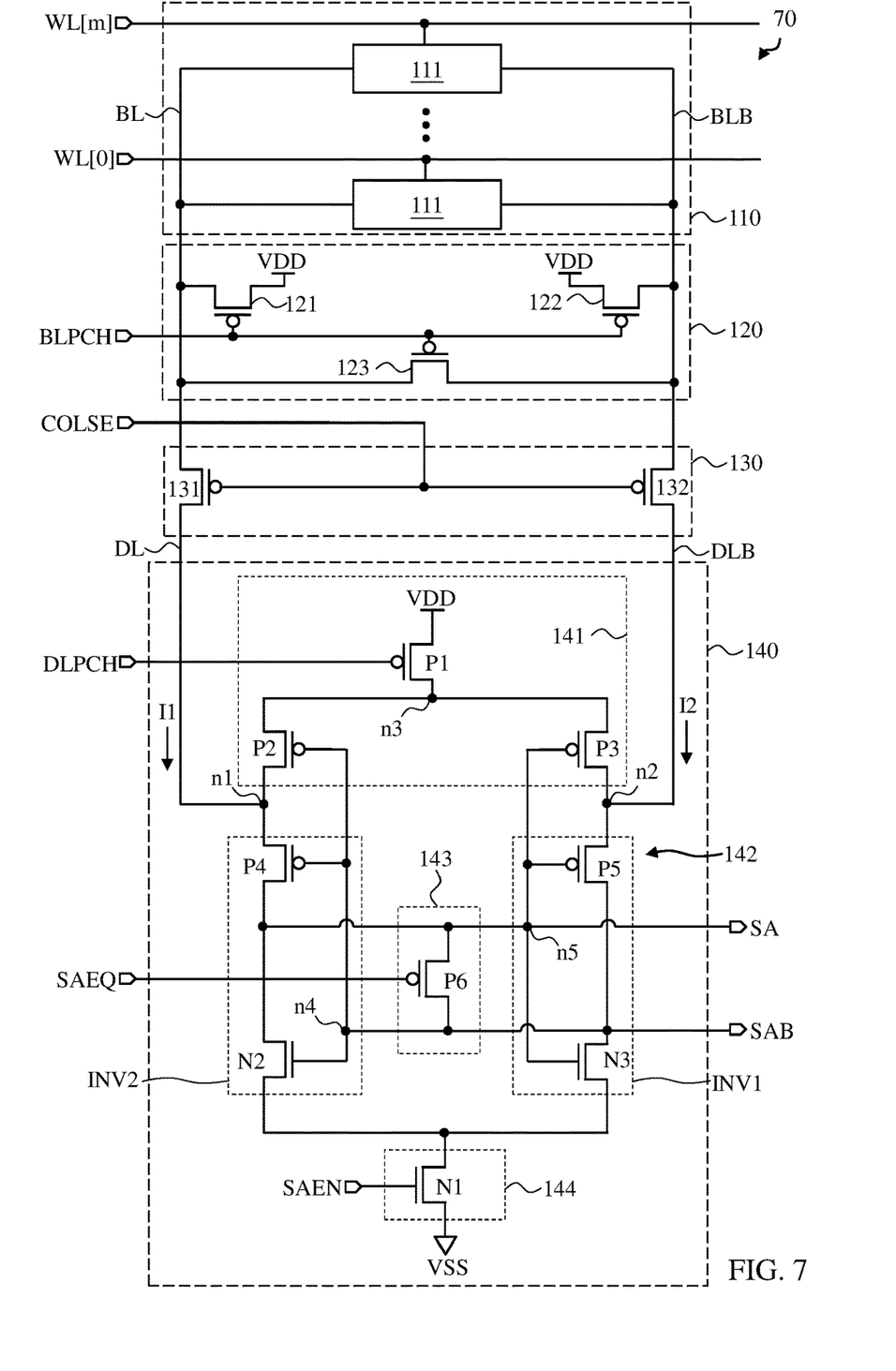
FIG. 7 is a schematic diagram of part of a memory device, in accordance with some embodiments of the present disclosure.

Reference is now made to FIG. 7. FIG. 7 is a schematic diagram of part of a memory device 70, in accordance with some embodiments of the present disclosure. In some embodiments, the memory device 70 is configured with respect to, for example, the memory device 10 of FIG. 1. With respect to the embodiments of FIG. 1, like elements in FIG. 7 are designated with the same reference numbers for ease of understanding. The specific operations of similar elements, which are already discussed in detail in above paragraphs, are omitted herein for the sake of brevity, unless there is a need to introduce the co-operation relationship with the elements shown in FIG. 7.

Compared with FIG. 1, instead of coupling the control terminals of the transistors P2-P3 together to the supply voltage terminal VSS, the control terminal of the transistor P2 is coupled to the node n4 and the control terminal of the transistor P3 is coupled to the node n5. Alternatively stated, the control terminal of the transistor P2 is coupled to the output terminal of the inverter INV1 and the input terminal of the inverter INV2. The control terminal of the transistor P3 is coupled to the output terminal of the inverter INV2 and the input terminal of the inverter INV1.

With the configurations of FIG. 7, cross-coupled feedback amplification occurs on both pull-up and pull-down sides.

The configurations of FIG. 7 are given for illustrative purposes. Various implements are within the contemplated scope of the present disclosure. For example, in some embodiments, the memory device 7 operates according to the waveforms shown in FIGS. 2-3 and FIGS. 5-6.

Figure 8:
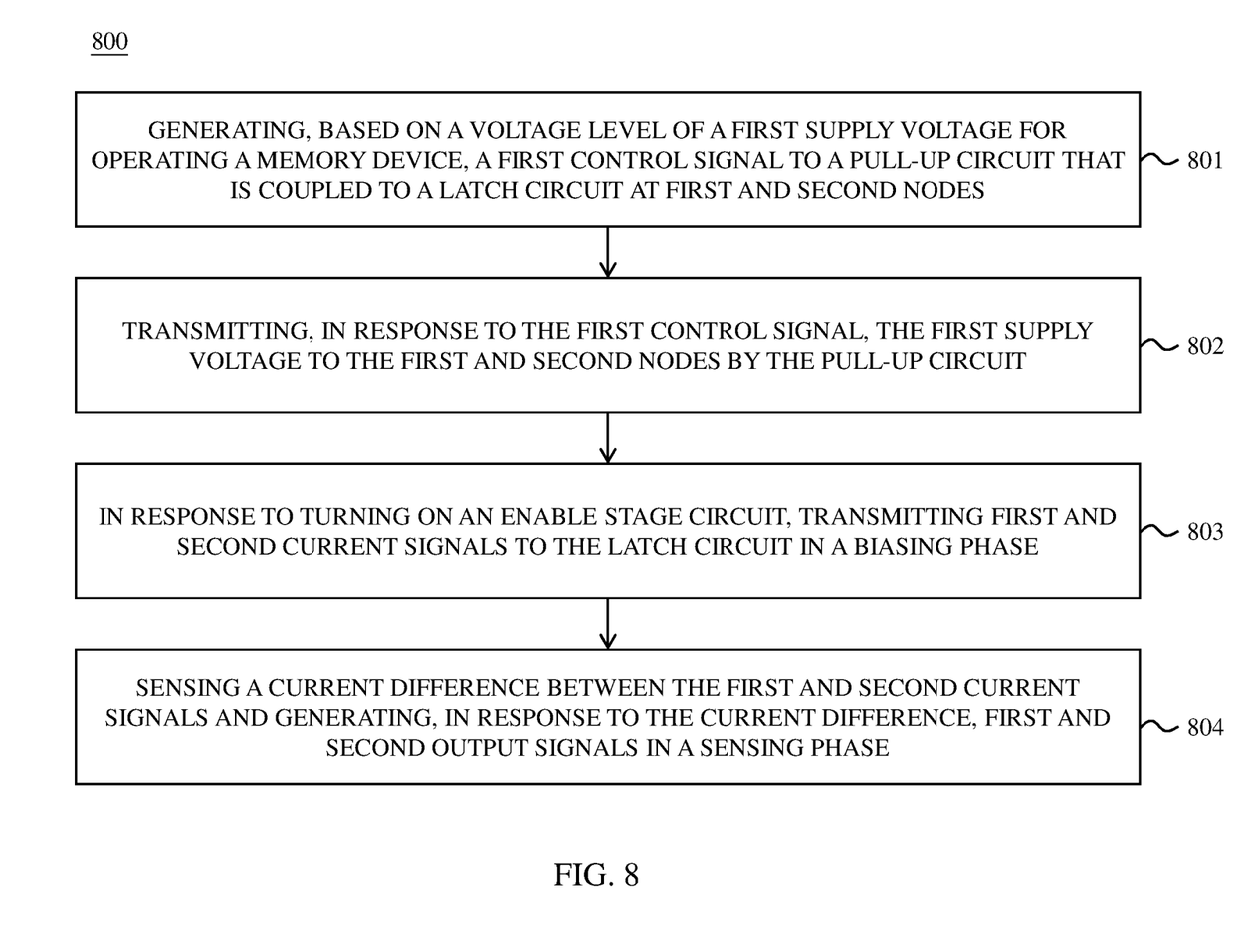
FIG. 8 is a flow chart of an operation method of a memory device, in accordance with some embodiments.

Reference is now made to FIG. 8. FIG. 8 is a flow chart of a method 800 of the memory device 10 or 70, in accordance with some embodiments. It is understood that additional operations can be provided before, during, and after the processes shown by FIG. 8, and some of the operations described below can be replaced or eliminated, for additional embodiments of the method. The order of the operations/processes may be interchangeable. Throughout the various views and illustrative embodiments, like reference numbers are used to designate like elements. The method 800 includes operations 801-804 that are described below with reference to the memory device 10 or 70 corresponding to FIGS. 1-7.

In operation 801, the control signal DLPCH is generated, based on the voltage level of the supply voltage VDD, to control the pull-up circuit 141 that is coupled to the a latch circuit 142 at the nodes n1 and n2. Specifically, in some embodiments, with reference to FIGS. 2-3, a control circuit (no shown) in the memory device 10 or 70 compares the voltage level of the supply voltage VDD with a predetermined voltage reference, for example, 0.6 Volts, and determines that the memory device 10 operates in the normal voltage mode or the low voltage mode.

In some embodiments, with reference to FIG. 2, generating the control signal DLPCH in the method 800 further includes operations of generating the control signal DLPCH having the low logic state in the read operation when the voltage level of the supply voltage VDD meets a first voltage condition that indicates the voltage level of the supply voltage VDD is greater than or equal to about 0.6 Volts and the memory device 10 is in the normal voltage mode.

In various embodiments, with reference to FIG. 3, generating the control signal DLPCH in the method 800 further includes operations of generating the control signal DLPCH having a pulse to turn off the transistor P1 included in the pull-up circuit 141 to disconnect the supply voltage terminal VDD from the nodes n1-n2 when the voltage level of the supply voltage VDD meets a second voltage condition that indicates the voltage level of the supply voltage VDD is smaller than about 0.6 Volts and the memory device 10 is in the low voltage mode. In some embodiments, a width (pulse duration) of the pulse in the control signal DLPCH of FIG. 3 is associated with the voltage level of the supply voltage VDD. For example, the lower the voltage level of the supply voltage VDD is, the longer the pulse duration is.

In operation 802, in response to the control signal DLPCH, the supply voltage VDD is transmitted to the nodes n1-n2 by the pull-up circuit 141. For example, in some embodiments of the memory device 10 in the normal voltage mode, the control signal DLPCH keeps having the low logic state to turn on the transistor P1 and the supply voltage VDD is received by the sense amplifier 140.

Continuing from the operation 802, in operation 803, in response to turning on the enable stage circuit 144, the sense amplifier 140 operates in the bias phase to receive the current signals I1-I2 that are transmitted to the latch circuit 142.

In some embodiments, as shown in FIG. 7, the method 800 further includes operations of disconnecting the supply voltage terminal VDD providing the supply voltage from the nodes n1-n2 by turning off the pull-up circuit 141 for the pulse duration in the time interval T1 before turning on the enable stage circuit 144. Furthermore, the method 500 further includes operations of reconnecting the supply voltage terminal VDD to the nodes n1-n2 after the pulse duration in the time interval T2.

In operation 804, the sense amplifier 140 operates in the sensing phase to sense a current difference between the current signals I1-I2 and generates, in response to the current difference, the output signals SA and SAB.

The configurations of FIG. 8 are given for illustrative purposes. Various implements are within the contemplated scope of the present disclosure. For example, in some embodiments, the voltage level for determining operation mode of the memory device is different from 0.6 Volts. Person who is skilled in the art can adjust the condition based on the actual practice of the present application.

To sum up, the present application provides a sense amplifier and an operation method thereof. By the configurations of a pull-up circuit coupled to the latch circuit in a current mode sense amplifier, faster access speed with lower power consumption is achieved and further reduces the read voltage applied on the word line during the read operation.

According to some embodiments of the present application, a memory device is provided, and includes a memory array and a sense amplifier. The sense amplifier operates with a first supply voltage and be enabled, in response to an enable signal, to receive first and second current signals from the memory array through first and second nodes, and includes a pull-up circuit and a latch circuit. The pull-up circuit is coupled between a first supply voltage terminal and the first to second nodes, and configured to couple, in response to a first control signal having a low logic state, the first supply voltage terminal to the first and second nodes. The latch circuit generates, in response to the first and second current signals received from the first and second nodes, first and second output signals for determining a data stored in a memory cell in the memory array when the first supply voltage terminal is coupled to the first and second nodes.

According to some embodiments of the present application, a method of operating the memory device is provided and includes operations of: generating, based on a voltage level of a first supply voltage for operating a memory device, a first control signal to a pull-up circuit that is coupled to a latch circuit at first and second nodes; transmitting, in response to the first control signal, the first supply voltage to the first and second nodes by the pull-up circuit; in response to turning on an enable stage circuit, transmitting first and second current signals to the latch circuit in a biasing phase; and sensing a current difference between the first and second current signals and generating, in response to the current difference, first and second output signals in a sensing phase.

According to some embodiments of the present application, a memory device is provided, and includes a sense amplifier that is coupled to a memory cell through first and second data lines, and includes a first transistor having a first terminal coupled to the first data line, a second transistor having a first terminal coupled to the second data line, and a third transistor configured to transmit, in response to a first control signal, a first supply voltage from a first terminal thereof to the first and second data lines through the first and second transistors. A second terminal of the third transistor is coupled to second terminals of the first and second transistors. The sense amplifier further includes a latch circuit including first and second inverters cross-coupled with each other. A pull-up transistor of the first inverter is coupled to the first data line at the first terminal of the first transistor, and a pull-up transistor of the second inverter is coupled to the second data line at the first terminal of the second transistor.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A memory device, comprising:
   a memory array;
   a sense amplifier configured to operate with a first supply voltage and be enabled, in response to an enable signal, to receive first and second current signals from the memory array through first and second nodes, and comprising:
     a pull-up circuit coupled between a first supply voltage terminal and the first to second nodes, and configured to couple, in response to a first control signal having a low logic state, the first supply voltage terminal to the first and second nodes; and
     a latch circuit configured to generate, in response to the first and second current signals received from the first and second nodes, first and second output signals for determining a data stored in a memory cell in the memory array when the first supply voltage terminal is coupled to the first and second nodes,
   wherein in a first operation mode of the memory device, the first supply voltage has a first value, the pull-up circuit is further configured to disconnect, in response to the first control signal, the first supply voltage terminal from the first and second nodes before the sense amplifier is enabled; and
   a signal generator configured to generate, in response to a clock signal, the first control signal having a pulse to turn off the pull-up circuit before the sense amplifier is enabled,
   wherein when the clock signal has a first amplitude, the pulse has a first width, and
   when the clock signal has a second amplitude smaller than the first amplitude, the pulse has a second width greater than the first width.

2. The memory device of claim 1, wherein the pull-up circuit comprises:
   a first transistor coupled between the first supply voltage terminal and a third node, and configured to be turned on in response to the first control signal;
   a second transistor coupled between the first and third nodes; and
   a third transistor coupled between the second and third nodes, wherein gate terminals of the second and third transistors are coupled together to a second supply voltage terminal different from the first supply voltage terminal.

3. The memory device of claim 2, wherein the first supply voltage terminal is configured to provide the first supply voltage, and the second supply voltage terminal is configured to provide a second supply voltage smaller than the first supply voltage.

4. The memory device of claim 2, wherein the first transistor, the second transistor, and the third transistor are P-type transistors, wherein the memory device further comprises:
   a fourth transistor coupled between the first output signal and the second output signal.

5. The memory device of claim 1, wherein the signal generator comprises:
   a first AND gate configured to generate a first delay signal according to the clock signal and a first delay clock signal, wherein when the clock signal has the second amplitude, the first delay clock signal has the low logic state;

a second AND gate configured to generate a second delay signal according to the clock signal and a second delay clock signal; and an exclusive-OR gate configured to generate the first control signal according to the clock signal and an output of OR operation of the first and second delay clock signals.

6. The memory device of claim 5, wherein the signal generator further comprises:

a first delay circuit comprising a first number of a plurality of first inverters each having a first threshold voltage, and configured to generate the first delay clock signal according to the clock signal; and a second delay circuit comprising a second number of a plurality of second inverters each having a second threshold voltage, and configured to generate the second delay clock signal according to the clock signal, wherein the first number is less than the second number, and the first threshold voltage is greater than the second threshold voltage.

7. The memory device of claim 1, wherein the pull-up circuit comprises:

a first transistor having a first terminal coupled to the first supply voltage and a second terminal configured to receive the first control signal;

a second transistor having a first terminal coupled to a third terminal of the first transistor, a second terminal coupled to the first node, and a third terminal coupled to a first output terminal, configured to output the second output signal, of the latch circuit; and a third transistor having a first terminal coupled to the third terminal of the first transistor, a second terminal coupled to the second node, and a third terminal coupled to a second output terminal, configured to output the first output signal, of the latch circuit.

8. The memory device of claim 7, wherein the latch circuit comprises:

a first P-type transistor having a first terminal coupled to the first node;

a first N-type transistor having a first terminal coupled to a second terminal of the first P-type transistor, wherein control terminals of the first P-type and N-type transistors are coupled to the second output terminal of the latch circuit;

a second P-type transistor having a first terminal coupled to the second node; and a second N-type transistor having a first terminal coupled to a second node terminal of the second P-type transistor, wherein control terminals of the second P-type and N-type transistors are coupled to the first output terminal of the latch circuit.

9. The memory device of claim 1, wherein in a second operation mode of the memory device, the first supply voltage has a second value greater than the first value and the pull-up circuit couples the first supply voltage terminal to the first and second nodes during a read operation.

10. The memory device of claim 1, wherein the pull-up circuit comprises:

a first transistor coupled between the first supply voltage terminal and a third node, and configured to be turned on in response to the first control signal;

a second transistor coupled between the first and third nodes; and a third transistor coupled between the second and third nodes, wherein gate terminals of the second and third transistors are coupled together to a second supply voltage terminal different from the first supply voltage terminal, wherein voltages at the first supply voltage terminal and at the second supply voltage terminal are different from each other.

11. A memory device, comprising:

a sense amplifier coupled to a memory cell through first and second data lines, and comprising:

a first transistor having a first terminal coupled to the first data line and a second transistor having a first terminal coupled to the second data line;

a third transistor configured to transmit, in response to a first control signal, a first supply voltage from a first terminal thereof to the first and second data lines through the first and second transistors, wherein a second terminal of the third transistor is coupled to second terminals of the first and second transistors; and a latch circuit comprising first and second inverters cross-coupled with each other, wherein a pull-up transistor of the first inverter is coupled to the first data line at the first terminal of the first transistor, and a pull-up transistor of the second inverter is coupled to the second data line at the first terminal of the second transistor.

12. The memory device of claim 11, wherein the sense amplifier further comprises:

a fourth transistor coupled between an output terminal of the first inverter and an output terminal of the second inverter, and configured to equalize, in response to a second control signal, first and second output signals generated by the latch circuit, wherein a control terminal of the first transistor is coupled to the output terminal of the second inverter, and a control terminal of the second transistor is coupled to the output terminal of the first inverter.

13. The memory device of claim 12, wherein in a first operation mode of the memory device, the first supply voltage has a first value and the third transistor is configured to be turned on, in response to the first control signal having a low logic state, during a read operation of the memory cell, wherein in a second operation mode of the memory device, when the first supply voltage has a second value less than the first value, the third transistor is configured to be turned off, in response to the first control signal having a high logic state, in a first time interval of the read operation, and is further configured to be turned on, in response to the first control signal having the low logic state, in a second time interval, after the first time interval, of the read operation.

14. The memory device of claim 11, wherein control terminals of the first and second transistors are coupled together to receive a second supply voltage smaller than the first supply voltage, wherein the first to third transistors are P-type transistors.

15. The memory device of claim 11, wherein the sense amplifier further comprises:

a fourth transistor coupled between the latch circuit and a supply voltage terminal providing a second supply voltage smaller the first supply voltage, and configured to be turned on, in response to a second control signal, to sink a first current signal in the first data line and a second current signal in the second data line.

16. A memory device, comprising:
a sense amplifier configured to operate with a first supply voltage and be enabled, in response to an enable signal, to receive first and second current signals from a first bit line and a second bit line through first and second nodes, and comprising:
 a pull-up circuit coupled between a first supply voltage terminal and the first to second nodes,
 wherein the pull-up circuit is configured to disconnect, in response to a first control signal having a first logic state, the first supply voltage terminal from the first and second nodes in a first time interval of a read operation, and further configured to couple, in response to the first control signal having a second logic state different from the first logic state, the first supply voltage terminal to the first and second nodes in a second time interval, after the first time interval, of the read operation;
 a latch circuit configured to generate, in response to the first and second current signals received from the first and second nodes, first and second output signals for determining a data stored in a memory cell when the first supply voltage terminal is coupled to the first and second nodes; and
 an equalization circuit coupled between the first and second output signals, and configured to equalize, in response to a second control signal, the first and second output signals in the first time interval of the read operation,
 wherein in the read operation the sense amplifier is enabled before a rising edge of the second control signal.

17. The memory device of claim 16, wherein the first logic state is a high logic state, and the second logic state is a low logic state.

18. The memory device of claim 16, wherein in the read operation, a falling edge of the first control signal is earlier than the rising edge of the second control signal.

19. The memory device of claim 16, wherein in the read operation the sense amplifier is enabled after the first time interval.

20. The memory device of claim 16, wherein in the read operation a falling edge of the first control signal and the rising edge of the second control signal occur at different times.

* * * * *